(12) United States Patent
Roggeband

(10) Patent No.: US 7,278,211 B2
(45) Date of Patent: Oct. 9, 2007

(54) BORE HOLE TOOL ASSEMBLY AND METHOD OF DESIGNING SAME

(75) Inventor: Serge Mathieu Roggeband, Rijswijk (NL)

(73) Assignee: Shell Oil Company, Houston, TX (US)

( * ) Notice: Subject to any disclaimer, the term of this patent is extended or adjusted under 35 U.S.C. 154(b) by 151 days.

(21) Appl. No.: 10/538,453

(22) PCT Filed: Dec. 12, 2003

(86) PCT No.: PCT/EP03/50996

§ 371 (c)(1),
(2), (4) Date: Jun. 10, 2005

(87) PCT Pub. No.: WO2004/053287

PCT Pub. Date: Jun. 24, 2004

(65) Prior Publication Data

US 2006/0110083 A1    May 25, 2006

(30) Foreign Application Priority Data

Dec. 12, 2002  (EP) ................... 02080230
Feb. 24, 2003  (EP) ................... 03075523

(51) Int. Cl.
*B21D 53/10*    (2006.01)
(52) U.S. Cl. .................... 29/898.09; 384/304
(58) Field of Classification Search ............ 29/898.09, 29/898.07, 898.061, 898.062; 384/304
See application file for complete search history.

(56) References Cited

U.S. PATENT DOCUMENTS

| 3,666,330 | A | 5/1972 | Dicky et al. |
| 4,729,675 | A | 3/1988 | Trzeciak et al. ............ 384/613 |
| 5,074,681 | A | 12/1991 | Turner et al. ............... 384/613 |
| 6,202,762 | B1 | 3/2001 | Fehr et al. .................. 175/107 |
| 2006/0118337 | A1 | 6/2006 | Roggeband ............. 166/242.6 |

*Primary Examiner*—Thomas R. Hannon

(57) ABSTRACT

A bore hole tool assembly utilizes a multi-stage bearing system deployed between an inner mandrel and an outer tool housing wherein each bearing stage includes bearing element deployed between two deformable elements. The deformable elements are selected, based on the design and material characteristics of the housing, mandrel and bearings, such that tension and compressive loads are distributed proportionally across each bearing stage. A method for calculating loading and the selection of the deformable elements is also disclosed.

18 Claims, 2 Drawing Sheets

BORE HOLE TOOL ASSEMBLY AND METHOD OF DESIGNING SAME

The present application claims priority on European Patent Application 02080230.2 filed 12 Dec. 2002 and European Patent Application 03075523.5 filed 24 Feb. 2003.

FIELD OF THE INVENTION

The present invention relates to bore hole tool assembly, in particular for use in a hydrocarbon well bore hole.

In further aspects, the invention relates to a bearing system for use in such a bore hole tool assembly, and to a method of designing such a bore hole tool assembly.

BACKGROUND OF THE INVENTION

In oil well drilling and completion operations, a bore hole tool assembly in the form of a tubular drill string is used. These drill strings can consist of various types and sizes of tubular components like drill pipes, heavy weight drill pipe, drill collars, liner, casing and tubing. These components can be used in various configurations.

These drill strings are subjected to mechanical tension and compression due to the weight of the drill string and friction against the well bore wall. A bearing assembly is required, if a portion of the drill string is to be independently rotated from the remaining part of the drill string. Such bearing assembly is subjected to the same tensile and compressive loading as the surrounding tubular members in the drill string.

In this type of use, the bearing assembly generally is provided in the annular space that is available between a tubular end of one drill string component, functioning as the mandrel, and a tubular end of another drill string component, functioning as the housing.

The cross sections of the mandrel and that of the housing are often constrained as a consequence of practical requirements. For instance, the maximum cross section of tubulars for use in a well bore is limited by the need of an annular space between the well bore and the tubulars for allowing sufficient flow of a drilling fluid containing drilled cuttings. The minimum cross section may be constrained by the demand for allowing sufficient flow of the drilling fluid or for enabling passage of objects of a given size such as cementation plugs or wire-line deployed tools. In addition, a minimum wall thickness of mandrel and housing are required for providing sufficient strength.

These requirements limit the space available for mounting the bearing assembly in the annular space. A single bearing stage that fits in the available space may have insufficient strength to bear the load that the bore hole tool assembly is subjected to. Therefore, it has been proposed to use a bearing system having a plurality of bearing stages arranged to transfer part of the axial load parallel to each other.

In practice, the respective bearing stages are arranged in the annular space with an axial displacement relative to each other, such that they act parallel to each other in transferring the axial load from the housing to the mandrel.

It has been found that, where each bearing stage of the bearing system can transfer a certain maximum static load before failure, the bearing series already fails under a static load that is significantly lower than the mentioned maximum load per bearing stage times the number of bearing stages in the series. Moreover, under rotary conditions the endurance life of the system is significantly less that would be expected from the specified endurance life of the individual bearings.

It is thus an object of the invention to increase the maximum allowable load for the bore hole tool assembly, and in particular for the bearing system.

It is another object of the invention to provide a bore hole tool assembly, and a bearing system for such a bore hole tool assembly, having a longer operational lifetime.

SUMMARY OF THE INVENTION

In accordance with the invention, one or more of these objects are achieved in a bore hole tool assembly comprising a housing and a mandrel reaching along an axial direction into the housing and a bearing system for transferring an axial load between the housing and the mandrel and allowing rotation of the housing relative to and about the mandrel, wherein the bearing system comprises at least two bearing stages each arranged to transfer part of the axial load, whereby each bearing stage comprises bearing means and mitigation means for distributing the load substantially proportionally over the respective bearing stages.

The invention is based on the insight that the mandrel and the housing in practice each behave as elastically deformable members having a certain mechanical stiffness. The entity mechanical stiffness is for the purpose of the present description defined as the ratio of the force transmitted through a member over a certain length and the amount of increment or decrement of that length. In order to avert an uneven distribution of the load over the bearing stages resulting from the elastic behaviour of the mandrel, the housing and the bearings, the mitigation means serves to distribute the load substantially proportionally over the respective bearing stages. Thereby it is substantially avoided that some of the bearing stages are loaded beyond their maximum allowable load while other bearing stages in the series could still have taken the excess portion of the load.

A substantially proportional distribution of the total load over the bearing stages is for the purpose of this patent application understood to include a distribution whereby the load on the bearing stage that receives the highest fraction of the total load does not exceed 1.5 times the average load being the total load divided by the number of bearing stages in the bearing system. Preferably it does not exceed 1.3 times the average load, and more preferably it does not exceed 1.1 times the average load.

For avoiding prematurely exceeding the maximum load in one of the bearing stages, it is sufficient that the mitigation means are arranged to distribute the load substantially proportionally over the respective bearing stages only when the load on one or more of the bearing stages approaches the maximum allowable load.

Since the entire bearing system fails upon failure of only one bearing stage, also the operational lifetime is increased as a result of the mitigation of the load from the most heavy-loaded bearing stage.

In an embodiment, the mitigation means comprises deformable means arranged to transfer at least part of the axial load in series with the respective bearing means. Deformable means deform under a load, so that the load in the bearing stage that takes up more than its proportional share is partially mitigated into deformation of the deformable means whereby consequently the remaining bearing stages are forced to pick up a relatively higher portion of the load as a result.

The deformable means may comprise a network of flexible fluid bellows that are in mutual fluid communication, whereby each bearing stage comprises such a flexible fluid bellow. Alternatively, deformable means may be made of combined elastic and plastic deformable material, or of essentially elastic deformable material.

An advantage of having elastic or elastic and plastic deformable mitigation means is that this allows for elastically biasing the mitigation means against the bearing means which therefore remain operative over a range of loads including medium high loads compared to the maximum allowable load. When also medium high loads are distributed substantially proportionally over the bearing stages, the wear on the bearing means is distributed more evenly over the respective bearing stages and thus the overall lifetime of the entire bearing system is further improved.

Preferably the mechanical stiffness of the deformation means in at least one of the stages is lower than that of the housing and that of the mandrel bridged by that stage. Incompatibility between the elastic behaviour in the housing and the mandrel is herewith suitably compensatable.

Ideally, the axial load is most easily distributed proportionally over the available bearing stages if the mechanical stiffness of each bearing stage is lower than the mechanical stiffness of the housing and than that of the mandrel by at least about 2 to 2.5 times per bearing stage in the system. However, this would require a long axial length for the entire bearing system, which is not normally not available nor desirable.

For this reason, the mechanical stiffness of the deformable means in one bearing stage is preferably different in magnitude from that of the deformable means in the other bearing stage. Herewith the axial load transferred by each bearing stage can be re-distributed over the bearing stages as desired, since the relative axial load taken by the bearing stage having the lower mechanical stiffness is lower than it would have been having equal mechanical stiffness as the other bearing stage. Thus by providing the lowest mechanical stiffness in the bearing stage that is otherwise the most heavy loaded, the load is distributed more proportionally over the bearing stages.

Herewith the axial length required for the bearing system is reduced. In practice, the mechanical stiffness in the bearing stages can be higher than one tenth of that the housing and/or the mandrel.

According to the second aspect of the invention there is provided a bearing system, for use in a bore hole tool assembly, in particular for an oil field tool assembly, for transferring an axial load between a housing and a mandrel reaching along the axial direction into the housing, and allowing rotation of the housing relative to and about the mandrel, which bearing system comprises at least two bearing stages each arranged to transfer part of the axial load, whereby each bearing stage comprises bearing means and mitigation means for distributing the load substantially proportionally over the respective bearing stages.

Advantages and further embodiments of the bearing system according to the invention have been presented in the description relating to the bore hole tool assembly above.

In accordance with the third aspect of the invention, there is provided a method of designing a bore hole tool assembly in accordance with the description above, the method comprising the steps of:
a) selecting a first bearing stage stiffness value for one bearing stage;
b) calculating, for given stiffness values of the parts of the housing that stretch between the bearing stages, and given stiffness values of the parts of the mandrel that stretch between the bearing stages, the value for the second bearing stage stiffness whereby the axial load is distributed substantially proportionally over the respective bearing stages, thereby using the selected first bearing stage stiffness value as input.

Herewith, a troublesome and time-consuming empirical try-and-error routine on a prototype model is avoidable.

This method can be part of a method of producing the bore hole tool assembly, wherein housing, mandrel, and bearing system comprising the bearing stages in accordance with the calculation are selected and assembled.

In particular where both the mandrel and the housing have a mechanical stiffness that is constant along the bearing stages, the appropriate values for the mechanical stiffness of the remaining bearing stages are advantageously expressed in stiffness ratios between the first bearing stage stiffness and the stiffness of the housing, and between the first bearing stage stiffness and the stiffness of the mandrel.

BRIEF DESCRIPTION OF THE DRAWING

The invention will described hereinafter in more detail and by way of example, with reference to the accompanying drawings in which.

In the Figures like reference signs relate to like components.

DETAILED DESCRIPTION OF THE PREFERRED EMBODIMENT

We describe a bore hole tool assembly, in particular for use in a hydrocarbon well bore hole, comprising a housing and a mandrel reaching along an axial direction into the housing and a bearing system for transferring an axial load between the housing and the mandrel and allowing rotation of the housing relative to and about the mandrel, wherein the bearing system comprises at least two bearing stages each arranged to transfer part of the axial load, and each bearing stage comprising bearing means.

Figure 1:
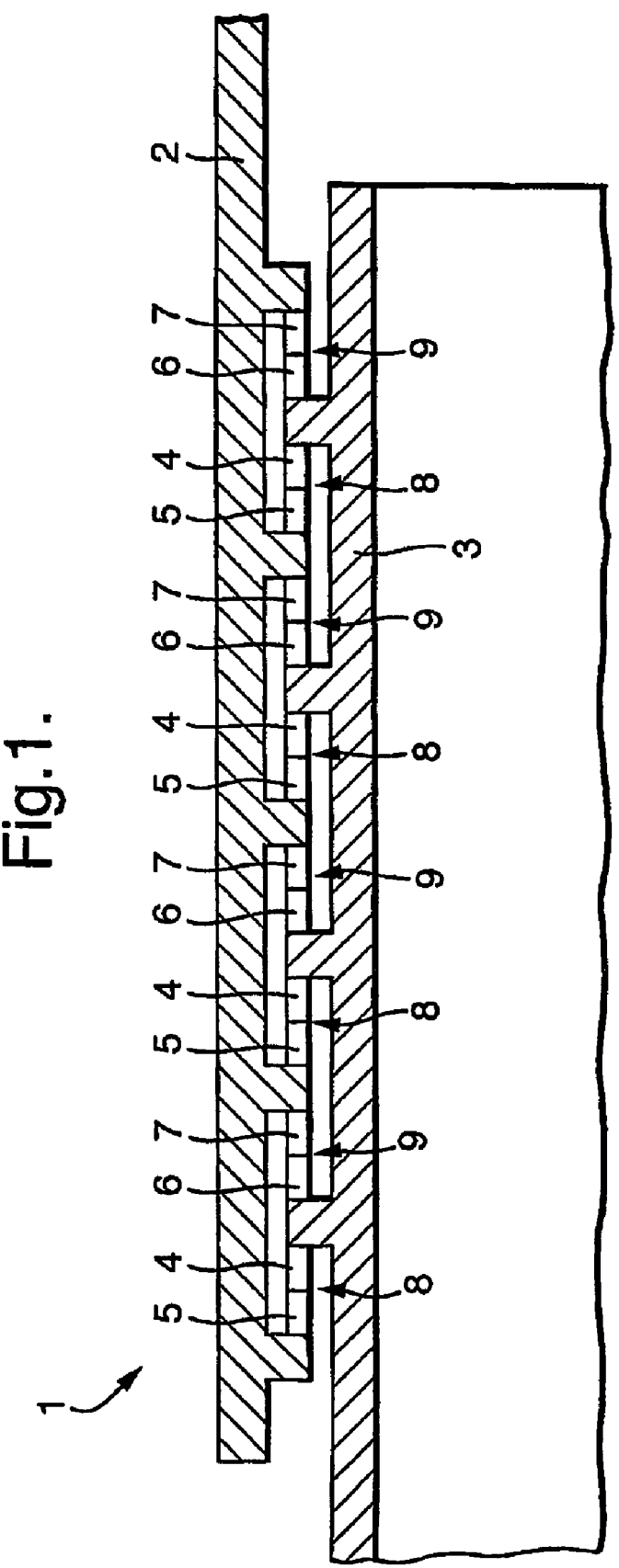
FIG. 1 schematically shows a cross sectional view of a bore hole tool assembly.

Referring to FIG. 1 there is schematically shown a bore hole tool assembly 1 in cross sectional view. The bore hole tool assembly comprises a tubular housing 2, and a tubular mandrel 3 reaching axially into the housing 2, leaving an annular space between the mandrel 3 and the housing 2. A number of bearing stages (8,9) is provided in the annular space, whereby each bearing stage connects to the mandrel on one side and to the housing on the other side. The bearing stages 8 are arranged to transmit, parallel to each other, a tensile axial force between the mandrel 3 and the housing 2; the bearing stages 9 are arranged to transmit a compressive force between the housing 2 and the mandrel 3.

Still referring to FIG. 1, the bearing stages (8,9) each comprise bearing means (4,6) and mitigation means (5,7). The bearings may be of any type, including roller bearings, ball bearings, spherical roller bearings, tapered roller bearings, frusto-conical roller bearings. Elongate bearings, radially arranged with respect to the axis of rotation of the housing 2 and mandrel 3, are preferred because the load in such bearings is distributed over a larger part of the bearing surface. The mitigation means can be provided in the form of any deformable material, such as a plastic or rubber like material, or in the form of a compressive spring such as an annular disc spring. As can be seen, the mitigation means is provided to transmit the load in each bearing stage in series with the respective bearing means in that stage.

By providing the deformable material in series with the bearing means, the mechanical stiffness of the bearing stage is lowered with respect to the mechanical stiffness of the bearing means per se. The distribution of the force over the available bearing stages is controllable by providing a bearing stage that in absence of the mitigation means would pick up a load higher than proportional with a lower mechanical stiffness than a bearing stage that in absence of the mitigation means would pick up a load lower than proportional.

The bore hole tool assembly depicted in FIG. 1 has a bearing system with four bearing stages. It has been found that for use in a typical hydrocarbon well bore four bearing stages provides a suitable optimisation between strength, reliability, endurance life, and size of the assembly. However, it will be appreciated that the number of bearing stages can be varied to any number of bearing stages with a minimum of two.

Below, the method for designing the bore hole tool assembly in accordance with the invention is further elucidated with reference to a mathematical approach. The mathematical approach is generalised for any number of bearing stages, denoted by n. It is remarked that the results of the mathematical approach discussed below hold for both compressive and tensile loading, and it also holds for a case wherein the consecutive deformable means are pre-strained against each other.

Figure 2A:
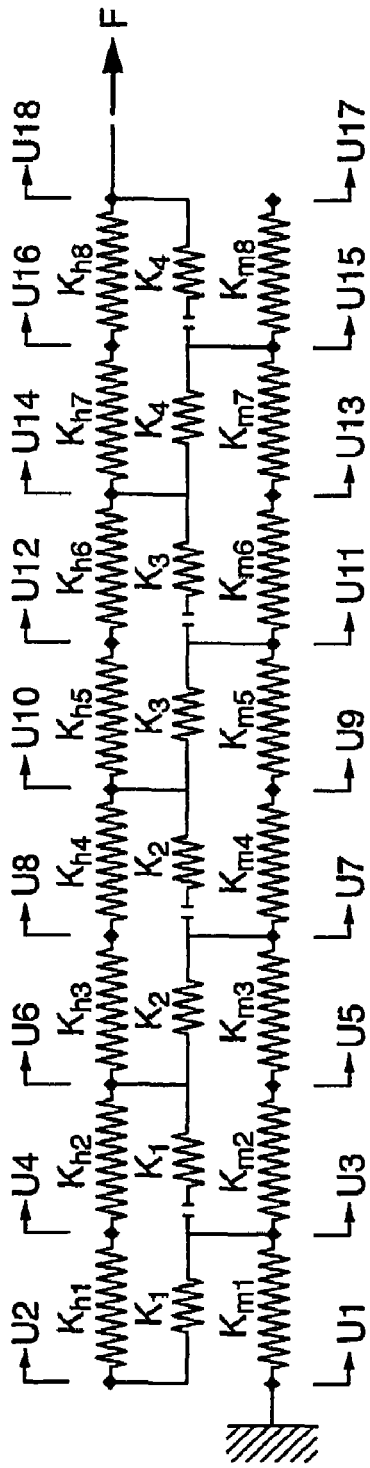
FIG. 2 shows an elastic-mechanical representation of the bore hole tool assembly shown in FIG. 1 for the case of tension (part a) and compression (part b).
Figure 2B:
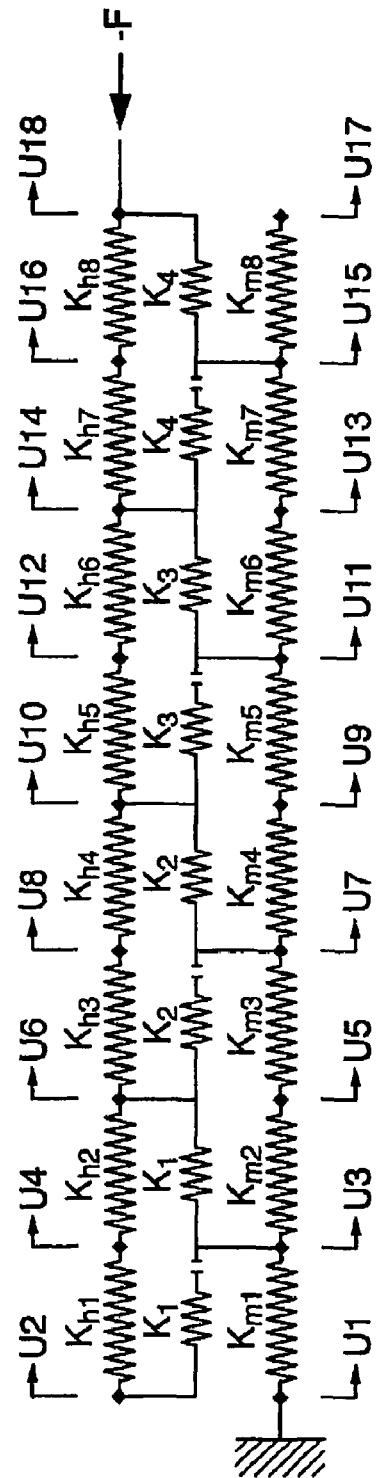

FIG. 2 shows an elastic-mechanical representation of the bore hole tool assembly that is depicted in FIG. 1, whereby FIG. 2a relates to the bore hole tool under a tensile load and FIG. 2b relates to the bore hole tool under a compressive load. Each of the bearing stages is numbered with the index k, whereby k=1, 2, ..., n. The index k=1 refers to the first bearing stage where the full load (tension or compression) acts in the mandrel. The index k=n refers to the last bearing stage where the full load (tension or compression) acts in the housing.

The housing and mandrel may consist of different sections, having for instance different lengths or different cross sectional areas. Each such section is denoted by an index i. The total number of sections is 2n. Each such section has a mechanical stiffness, defined as the ratio of the force transmitted through the section having a certain length and the amount of increment or decrement of that length. The stiffness values of the respective sections along the housing are denoted by $K_{hi}$, whereby i=1, 2, ..., 2n. The stiffness values of the respective sections along the mandrel are denoted by $K_{mi}$ i=1, 2, ..., 2n.

Displacements of indexed points between the sections along the mandrel and housing are given by $U_j$, whereby j=1, 2, 3, ..., (4n+2). Even numbers j correspond to points on the housing and odd numbers j correspond to points on the mandrel.

The mandrel stiffness $K_{mi}$ and housing stiffness $K_{hi}$ for a certain section (with number i) can be calculated on the basis of the dimensions and material properties of the cross sections using the following equations:

$$K_{hi} = \frac{A_{hi} E_h}{L_i},$$

$$K_{mi} = \frac{A_{mi} E_m}{L_i}$$

wherein
$A_{hi}$ is the cross sectional area of housing section i [m²];
$A_{mi}$ is the cross sectional area of mandrel section i [m²];
$L_i$ is the length of housing or mandrel section i [m];
$E_h$ is the elasticity modulus of housing material [N/m²]; and
$E_m$ is the elasticity modulus of mandrel material [N/m²].

The bearing stage stiffnesses $K_1, K_2, ..., K_n$ correspond to the combined stiffnesses of the combination of a bearing and a deformable means, in this example in the form of a spring, in series in the bearing stage with number k $$K_k = \frac{K_{spring,k} K_{bearing,k}}{K_{spring,k} + K_{bearing,k}}$$

wherein $K_{bearing,k}$ and $K_{spring,k}$ respectively are the bearing stiffnesses and the spring stiffness for the k-th bearing stage.

It is a task to find values for the respective spring stiffnesses $K_{spring,k}$ such that the total axial force F, transmitted between the mandrel and the housing, is distributed proportionally over the available bearing stages. In other words, the force $F_k$ transmitted by each bearing stage must ideally be 1/n-th of the total force:

$$F_k = \frac{1}{n} F.$$

In a situation where the proportional force distribution is achieved, the displacements $U_j$ (see FIG. 2) along the mandrel become:

$U_1 = 0$, (Taken as a reference)

$U_3 = \dfrac{F}{K_{m1}}$, $U_5 = U_3 + \dfrac{n-1}{n} \dfrac{F}{K_{m2}} = U_3 + \dfrac{1}{n}\left[(n-1)\dfrac{1}{K_{m2}}\right] F,$ $U_7 = U_5 + \dfrac{F}{K_{m3}} = U_3 + \dfrac{1}{n}\left[(n-1)\left(\dfrac{1}{K_{m2}} + \dfrac{1}{K_{m3}}\right)\right] F,$ $U_9 =$ $U_7 + \left(1 - \dfrac{2}{n}\right)\dfrac{F}{K_{m4}} = U_3 + \dfrac{1}{n}\left[(n-1)\left(\dfrac{1}{K_{m2}} + \dfrac{1}{K_{m3}}\right) + (n-2)\left(\dfrac{1}{K_{m4}}\right)\right] F,$ $U_{11} = U_9 + \left(1 - \dfrac{2}{n}\right)\dfrac{F}{K_{m5}} =$ $U_3 + \dfrac{1}{n}\left[(n-1)\left(\dfrac{1}{K_{m2}} + \dfrac{1}{K_{m3}}\right) + (n-2)\left(\dfrac{1}{K_{m4}} + \dfrac{1}{K_{m5}}\right)\right] F,$ $U_{13} = U_{11} + \left(1 - \dfrac{3}{n}\right)\dfrac{F}{K_{m6}} = U_3 +$ $\dfrac{1}{n}\left[(n-1)\left(\dfrac{1}{K_{m2}} + \dfrac{1}{K_{m3}}\right) + (n-2)\left(\dfrac{1}{K_{m4}} + \dfrac{1}{K_{m5}}\right) + (n-3)\left(\dfrac{1}{K_{m6}}\right)\right] F,$ $U_{15} = U_{13} + \left(1 - \dfrac{3}{n}\right)\dfrac{F}{K_{m7}} = U_3 + \dfrac{1}{n}\left[(n-1)\left(\dfrac{1}{K_{m2}} + \dfrac{1}{K_{m3}}\right) +\right.$ $\left.(n-2)\left(\dfrac{1}{K_{m4}} + \dfrac{1}{K_{m5}}\right) + (n-3)\left(\dfrac{1}{K_{m6}} + \dfrac{1}{K_{m7}}\right)\right] F,$ etc.

A first bearing stage stiffness value $K_1$ is selected. Normally, the stiffness of the bearing means has a given value so that the selected bearing stage stiffness is obtained by proper selection of the mitigation means having the appropriate stiffness value. The selection of a suitable bearing stage stiffness can based on strength considerations. In the desired situation of proportionally distributed force, the displacements $U_j$ long the housing can be expressed in terms of $K_1$:

$$U_2 = U_3 + \frac{1}{K_1}\frac{F}{n},$$

-continued $$U_4 = U_2 + \frac{1}{n}\frac{F}{K_{h1}} = U_3 + \frac{1}{n}\left[\frac{1}{K_1} + \frac{1}{K_{h1}}\right]F,$$

$$U_6 = U_4 + \frac{1}{n}\frac{F}{K_{h2}} = U_3 + \frac{1}{n}\left[\frac{1}{K_1} + \frac{1}{K_{h1}} + \frac{1}{K_{h2}}\right]F,$$

$$U_8 = U_6 + \frac{2}{n}\frac{F}{K_{h3}} = U_3 + \frac{1}{n}\left[\frac{1}{K_1} + \frac{1}{K_{h1}} + \frac{1}{K_{h2}} + \frac{2}{K_{h3}}\right]F,$$

$$U_{10} = U_8 + \frac{2}{n}\frac{F}{K_{h4}} = U_3 + \frac{1}{n}\left[\frac{1}{K_1} + \frac{1}{K_{h1}} + \frac{1}{K_{h2}} + \frac{2}{K_{h3}} + \frac{2}{K_{h4}}\right]F,$$

$$U_{12} = U_{10} + \frac{3}{n}\frac{F}{K_{h5}} = U_3 + \frac{1}{n}\left[\frac{1}{K_1} + \frac{1}{K_{h1}} + \frac{1}{K_{h2}} + \frac{2}{K_{h3}} + \frac{2}{K_{h4}} + \frac{3}{K_{h5}}\right]F,$$

$$U_{14} = U_{12} + \frac{3}{n}\frac{F}{K_{h6}} =$$

$$U_3 + \frac{1}{n}\left[\frac{1}{K_1} + \frac{1}{K_{h1}} + \frac{1}{K_{h2}} + \frac{2}{K_{h3}} + \frac{2}{K_{h4}} + \frac{3}{K_{h5}} + \frac{3}{K_{h6}}\right]F,$$

etc.

Having made the selection of the stiffness value for $K_1$, the optimal values for the remaining bearing stage stiffnesses $K_2, K_3, \ldots, K_n$ can be mathematically solved in order to obtain the uniform force distribution. This is done as follows. For the optimal stiffness of the second bearing stages should hold:

$$F_2 = K_2(U_6 - U_7) \equiv \frac{1}{n}F,$$

$$F_3 = K_3(U_{10} - U_{11}) \equiv \frac{1}{n}F$$

$$F_4 = K_4(U_{14} - U_{15}) \equiv \frac{1}{n}F,$$

etc.

When substituting the expressions given above for the displacements $U_j$ along the mandrel (j odd) and housing (j even), this yields for the optimal ratios of the bearing stage stiffnesses $K_k/K_1$, k=2, 3, . . . , n:

$$\frac{K_2}{K_1} = \left[1 + \left(\frac{K_1}{K_{h1}} + \frac{K_1}{K_{h2}}\right) - (n-1)\left(\frac{K_1}{K_{m2}} + \frac{K_1}{K_{m3}}\right)\right]^{-1},$$

$$\frac{K_3}{K_1} = \left[\begin{array}{c}1 + \left(\frac{K_1}{K_{h1}} + \frac{K_1}{K_{h2}}\right) + 2\left(\frac{K_1}{K_{h3}} + \frac{K_1}{K_{h4}}\right) - \\ (n-1)\left(\frac{K_1}{K_{m2}} + \frac{K_1}{K_{m3}}\right) - (n-2)\left(\frac{K_1}{K_{m4}} + \frac{K_1}{K_{m5}}\right)\end{array}\right]^{-1},$$

$$\frac{K_4}{K_1} =$$

$$\left[\begin{array}{c}1 + \left(\frac{K_1}{K_{h1}} + \frac{K_1}{K_{h2}}\right) + 2\left(\frac{K_1}{K_{h3}} + \frac{K_1}{K_{h4}}\right) + 3\left(\frac{K_1}{K_{h5}} + \frac{K_1}{K_{h6}}\right) \ldots - \\ (n-1)\left(\frac{K_1}{K_{m2}} + \frac{K_1}{K_{m3}}\right) - (n-2)\left(\frac{K_1}{K_{m4}} + \frac{K_1}{K_{m5}}\right) - (n-3)\left(\frac{K_1}{K_{m6}} + \frac{K_1}{K_{m7}}\right)\end{array}\right]^{-1},$$

etc.

These equations hold for the general situation where the stiffness values in the housing and the mandrel can be different for each section i. However, for a perhaps more realistic situation where the housing and mandrel stiffnesses are constant along the sections, i.e. assuming that $K_{m1}=K_{m2}=\ldots=K_{mn}\equiv K_m$ for the mandrel and that $K_{h1}=K_{h2}=\ldots=K_{hn}\equiv K_h$ for the housing, the equations can be significantly simplified. In that case the optional bearing stage stiffnesses are given by $$\frac{K_k}{K_1} = \left[1 + A_k\frac{K_1}{K_h} + B_k\frac{K_1}{K_m}\right]^{-1},$$

$$A_k = k(k-1),$$

$$B_k = (k-1)(k-2n)$$

As can be seen, the optimum stiffness ratios $K_k/K_1$ whereby the force is distributed proportionally over the available bearing stages, depend only on the ratios of $K_1/K_h$ and $K_1/K_m$. The differences in optimal stiffnesses decrease as the value of the first bearing stage stiffness is selected lower.

It is remarked that the entity stiffness, including $K_h$, $K_m$, $K_1$, $K_k$ is given in dimensions of force per unit distance [N/m]. The factors $A_k$ and $B_k$, as well as the indexing numbers, are dimensionless.

If the mechanical stiffness of the deformable mitigation means in each bearing stage is lower than the mechanical stiffness of the housing or that of the Preferably, the mechanical stiffness $K_h$, of the part of the housing that stretches between the bearing stages, and the mechanical stiffness $K_m$, of the part of the mandrel that stretches between the bearing stages, differ from each other by less than a factor of 3.

If the mechanical stiffness of the deformable mitigation means in each bearing stage is lower than the mechanical stiffness of the housing or that of the mandrel (whichever of the two is the lowest) by at least 2 to 2.5 times per bearing stage in the bearing system, then the axial load is most easily distributed proportionally over the available bearing stages because the ratios between the various bearing stage stiffnesses approaches unity.

However, with the constraints imposed in practical application, such as size and required strength, the mechanical stiffness of the deformable mitigation means in each bearing stage lies somewhere between 0.25 and 2.5 times per bearing stage lower than the lower value of the stiffness of the housing or mandrel. In that case, a more proportional distribution of the force over the available bearing stages is obtainable by optimisation of the respective bearing stage stiffnesses. Preferably, it is herewith prevented that one single bearing stage takes a significantly larger than proportional part of the total load, for instance at most 1.5×F/n.

For a bore hole tool assembly having a bearing system with two bearing stages, and a constant stiffness along the mandrel and the housing, the optimal stiffness $K_2$ that matches with $K_1$ as selected to achieve a proportional force distribution over both bearing stages is thus given by:

$$\frac{K_2}{K_1} = \left[1 + 2\frac{K_1}{K_h} - 2\frac{K_1}{K_m}\right]^{-1}$$

For a bore hole tool assembly having a bearing system with three bearing stages, and a constant stiffness along the mandrel and the housing, the optimal stiffnesses $K_2$ and $K_3$ are:

$$\frac{K_2}{K_1} = \left[1 + 2\frac{K_1}{K_h} - 4\frac{K_1}{K_m}\right]^{-1},$$

-continued $$\frac{K_3}{K_1} = \left[1 + 6\frac{K_1}{K_h} - 6\frac{K_1}{K_m}\right]^{-1}$$

For a bore hole tool assembly having a bearing system with four bearing stages, and a constant stiffness along the mandrel and the housing, the optimal stiffnesses $K_2$, $K_3$ and $K_4$ are:

$$\frac{K_2}{K_1} = \left[1 + 2\frac{K_1}{K_h} - 6\frac{K_1}{K_m}\right]^{-1},$$

$$\frac{K_3}{K_1} = \left[1 + 6\frac{K_1}{K_h} - 10\frac{K_1}{K_m}\right]^{-1},$$

$$\frac{K_4}{K_1} = \left[1 + 12\frac{K_1}{K_h} - 12\frac{K_1}{K_m}\right]^{-1}$$

It has been assumed in the above explanation that the mechanical stiffness behaves linear with the load. In cases where the mechanical response of a member to a load is non-linear, the mechanical stiffness of that member should be determined for the load that occurs if the total design load for the bearing system is sufficiently proportionally distributed over the bearing stages.

It will be appreciated that practical constraints such as availability of springs can lead to a design where some of the section lengths $L_i$ of the housing/mandrel need to be longer than others in order to obtain a desired bearing stage stiffness. The equations given above must then be adapted for that specific case.

EXAMPLE

An oil well drilling tool which is capable of transferring 2000 kN both in tensile as well as in compressive loading is considered. The total force needs to be equally distributed over n=4 bearing stages. In this way the static strength of any of the bearings is not exceeded prematurely and in addition the endurance of the bearing system life is improved. The tool is based on a circular cylindrical mandrel and a circular cylindrical housing.

The functional specifications for the design put restrictions on the dimensions, in particular the cross sectional areas, of the mandrel and the housing. The mandrel and the housing are made of steel, with an elasticity modulus of $E^m=E_h=2.1\times10^5$ N/mm$^2$. The outer diameter of the housing is restricted to a maximum of 181 mm. The inner diameter of a cylindrical mandrel is restricted to a minimum of 63.5 mm.

The bearings that are used are thrust bearings have an inner (shaft) diameter of 110 mm, outer (housing) diameter of 145 mm and axial length of 25 mm. The stiffness of all the bearings, as obtained from the bearing manufacturer, is $K_{bearing}=4.11\times10^6$ N/mm, defined as the ratio of the axial force applied to the bearing and the axial shortening of the bearing resulting from the axial force applied to the bearing. The mandrel outer diameter along the sections of the mandrel is 100 mm such that the bearings can be fit and centred in the tool. The housing inner diameter along the sections of the housing is 150 mm. The section lengths ($L_1$, $L_2$, $L_3$, etc.) along the housing and mandrel required for the bearings, spring and fixtures/fittings to the mandrel and housing is 75 mm.

In order to be able to transfer a load of 500 kN, per bearing stage a disc spring is provided having a thickness of 20 mm and a stiffness $K_{spring}=1.35\times10^6$ N/mm.

The stiffness $K_h$ of each 75-mm section along the housing is given by:

$$K_h = \frac{E_h A_h}{L} = \frac{2.1\times10^5 \times \frac{\pi}{4}(181^2 - 150^2)}{75} = 22.6\times10^6 \text{ N/mm}^2$$

The stiffness $K_m$ of each 75-mm sections along the mandrel is given by:

$$K_m = \frac{E_m A_m}{L} = \frac{2.1\times10^5 \times \frac{\pi}{4}(100^2 - 63.5^2)}{75} = 13.1\times10^6 \text{ N/mm}^2$$

At the first bearing stage two disc springs are mounted in series, which more practically halves the stiffness. The combined stiffness $K_1$ of the two springs and bearing in series at the first bearing stage is given by:

$$K_1 = \frac{\frac{1}{2}S_{spring} \times S_{bearing}}{\frac{1}{2}S_{spring} + S_{bearing}} = \frac{\frac{1}{2}\times 1.35\times10^6 \times 4.11\times10^6}{\frac{1}{2}\times 1.35\times10^6 + 4.11\times10^6} = 0.58\times10^6 \text{ N/mm}^2$$

So that the relevant stiffness ratios $K_1/K_h$ and $K_1/K_m$ become:

$$\frac{K_1}{K_h} = \frac{0.58\times10^6}{22.6\times10^6} = 0.025,$$

$$\frac{K_1}{K_m} = \frac{0.58\times10^6}{13.1\times10^6} = 0.044$$

Using these values, the stiffness ratios for the other bearing stages can be calculated for which the load is divided proportionally over all the bearing stages:

$$\frac{K_2}{K_1} = \left[1 + 2\frac{K_1}{K_h} - 6\frac{K_1}{K_m}\right]^{-1} =$$
$$[1 + 2\times 0.025 - 6\times 0.044]^{-1} = 1.27 \Rightarrow K_2 = 1.27 K_1$$

$$\frac{K_3}{K_1} = \left[1 + 6\frac{K_1}{K_h} - 10\frac{K_1}{K_m}\right]^{-1} =$$
$$[1 + 6\times 0.025 - 10\times 0.044]^{-1} = 1.16 \Rightarrow K_3 = 1.16 K_1$$

$$\frac{K_4}{K_1} = \left[1 + 12\frac{K_1}{K_h} - 12\frac{K_1}{K_m}\right]^{-1} =$$
$$[1 + 12\times 0.025 - 12\times 0.044]^{-1} = 1.29 \Rightarrow K_4 = 1.29 K_1$$

These higher values for the bearing stage stiffnesses can be achieved by mounting stiffer springs in series with the bearings than at stage 1. The relation for the combined stiffness $K_k$ at a bearing stage k (with two springs in series) can be reformulated as follows:

$$K_k = \frac{\frac{1}{2}K_{spring,k} \times K_{bearing}}{\frac{1}{2}K_{spring,k} + K_{bearing}} \Rightarrow K_{spring,k} = 2\frac{K_{bearing} \times K_k}{K_{bearing} - K_k}$$

Now the required spring stiffness values for the bearing stages 2, 3, 4 are:

$$K_{spring,1} = 2\frac{K_{bearing} \times 1.27K_1}{K_{bearing} - 1.27K_1} = 2\frac{4.11 \times 1.27 \times 0.58}{4.11 - 1.27 \times 0.58} \times 10^6 = 1.796 \times 10^6 \text{ N/mm}^2$$

$$K_{spring,2} = 2\frac{K_{bearing} \times 1.16K_1}{K_{bearing} - 1.16K_1} = 2\frac{4.11 \times 1.16 \times 0.58}{4.11 - 1.16 \times 0.58} \times 10^6 = 1.608 \times 10^6 \text{ N/mm}^2$$

$$K_{spring,3} = 2\frac{K_{bearing} \times 1.29K_1}{K_{bearing} - 1.29K_1} = 2\frac{4.11 \times 1.29 \times 0.58}{4.11 - 1.29 \times 0.58} \times 10^6 = 1.830 \times 10^6 \text{ N/mm}^2$$

In this practical example the differences in optimal stiffness values are relatively small. This is due the fact that by design the cross sectional areas of the mandrel and of the housing only differ a factor of about 2, which is favourable. In addition, by taking two springs in series at the first bearing stage, the values of the important ratios $K_1/K_m$ and $K_1/K_h$ could be restricted. With other design choices, the differences in optimal spring stiffness values could have become significantly larger.

Although for some applications, such as described above, the mandrel is preferably provided in the form of a tubular element, the invention also works for a solid mandrel, and even for housing and/or mandrel having a non-circular cross section such as a square cross section.

It is remarked that a bearing system as described herein can, in addition to its use in a bore hole tool assembly, advantageously be used in other fields of technology wherein relatively high axial loads are desired to be rotatably transferred from a housing to a mandrel or an axis, or vice versa. Examples of such fields include automotive applications, in particular heavy trucks, locomotives, drive shaft for marine vessels. This is also the case mutatis mutandis for the described method of designing the bore hole tool assembly.

Unpublished European patent application No. 02080230, which serves as a priority application for the present application and is herewith incorporated by reference, describes detailed embodiments of a system for use in a bore hole wherein the bore hole tool assembly in accordance with the present invention can advantageously be embodied.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

We claim:

1. A method of designing a bore hole tool assembly comprising a housing and a mandrel reaching alone an axial direction into the housing and a bearing system for transferring an axial load between the housing and the mandrel and allowing rotation of the housing relative to and about the mandrel, wherein the bearing system comprises at least two bearing stages each arranged to transfer part of the axial load, whereby each bearing stage comprises bearing means and mitigation means for distributing the load substantially proportionally over the respective bearing stages, the method comprising the steps of:
   a) selecting a first bearing stage stiffness value for one bearing stage;
   b) calculating, for given stiffness values of the parts of the housing that stretch between the bearing stages and given stiffness values of the parts of the mandrel that stretch between the bearing stages, the value for the second bearing stage stiffness whereby the axial load is distributed substantially proportionally over the respective bearing stages, thereby using the first bearing stage stiffness value as input.

2. The method according to claim 1, wherein step b. comprises:
   b1) determining a first stiffness ratio being the quotient of said first bearing stage stiffness and the stiffness of the housing;
   b2) determining a second stiffness ratio being the quotient of said first bearing stage stiffness and the stiffness of the mandrel.

3. The method according to claim 2, wherein the mandrel is a tubular end.

4. The method of claim 3, wherein the housing is a tubular end.

5. The method according to claim 2, wherein the mechanical stiffness of the part of the housing spanning between said at least two bearing stages, and the mechanical stiffness of the part of the mandrel spanning between said at least two bearing stages differ from each other a factor smaller than 3.

6. The method according to claim 2, wherein the mitigation means comprises deformable means having a mechanical stiffness, arranged to transfer at least part of the axial load in series with the respective bearing means.

7. The method according to claim 6, wherein the mechanical stiffness of said deformable mitigation means in at least one of said at least two bearing stages is lower than that of the housing and that of the mandrel in a section bridged by that bearing stage.

8. The method according to claim 6, wherein the mechanical stiffness of said deformable mitigation means in each bearing stage is between 0.25 and 2.5 times per bearing stage lower than the lowest value out of the stiffness of the housing and the stiffness of the mandrel.

9. The method according to claim 6, wherein the mechanical stiffness of said deformable mitigation means in at least one of said at least two bearing stages is different in magnitude from that of the deformable mitigation means in the other of said at least two bearing stages.

10. The method according to claim 6, wherein the mechanical stiffness of said deformable mitigation means in at least one of said at least two bearing stages is different in magnitude from that of at least one other of said at least two bearing stages.

11. The method according to claim 1, wherein the mitigation means comprises deformable means having a mechanical stiffness, arranged to transfer at least part of the axial load in series with the respective bearing means.

12. The method according to claim 11, wherein the mechanical stiffness of said deformable mitigation means in at least one of said at least two bearing stages is lower than that of the housing and that of the mandrel in a section bridged by that bearing stage.

13. The method according to claim 11, wherein the mechanical stiffness of said deformable mitigation means in each bearing stage is between 0.25 and 2.5 times per bearing stage lower than the lowest value out of the stiffness of the housing and the stiffness of the mandrel.

14. The method according to claim 11, wherein the mechanical stiffness of said deformable mitigation means in at least one of said at least two bearing stages is different in magnitude from that of the deformable mitigation means in the other of said at least two bearing stages.

15. The method according to claim 11, wherein the mechanical stiffness of said deformable mitigation means in at least one of said at least two bearing stages is different in magnitude from that of at least one other of said at least two bearing stages.

16. The method according to claim 1, wherein the mechanical stiffness of the part of the housing spanning between said at least two bearing stages, and the mechanical stiffness of the part of the mandrel spanning between said at least two bearing stages differ from each other a factor smaller than 3.

17. The method according to claim 1, wherein the mandrel is a tubular end.

18. The method of claim 17, wherein the housing is a tubular end.

* * * * *